United States Patent [19]

Cocks et al.

[11] 4,288,906
[45] Sep. 15, 1981

[54] PIPE JOINTING

[75] Inventors: Philip J. Cocks; Derek A. Newton, both of Warwickshire, England

[73] Assignee: Dunlop Limited, West Midlands, England

[21] Appl. No.: 87,036

[22] Filed: Oct. 22, 1979

[30] Foreign Application Priority Data

Oct. 25, 1978 [GB] United Kingdom ............... 41948/78

[51] Int. Cl.³ .............................................. B23P 19/00
[52] U.S. Cl. .................................. 29/526 R; 285/293; 285/382; 29/283.5; 29/237
[58] Field of Search ................... 29/526 R, 505, 283.5, 29/237; 285/293, 382, 419

[56] References Cited

U.S. PATENT DOCUMENTS 4,135,634 1/1979 Frye ..................................... 285/419

Primary Examiner—James L. Jones, Jr.
Attorney, Agent, or Firm—Stevens, Davis, Miller & Mosher

[57] ABSTRACT

A method and apparatus is provided whereby a joint can be made on site between two flanged pipe ends by winding a ductile metal strip over the flanged ends so that lateral portions of the strip are deformed radially inwardly behind the flanges to entrap them together. The apparatus takes the form of a frame 10 rotatably supporting an annular member 11 which can be brought coaxially to surround the pipe ends. A ductile metal strip is drawn from a reel 17 on the frame and passes in succession between rollers 15 and the flanged pipe ends, the rollers 15 having a progressively more waisted profile so as to bring the strip progressively to a channel shape enclosing the pipe flanges. As the strip is wound spirally over the pipe ends masking 33 is removed from an adhesive ribbon whereby superimposed turns of the strip are bonded together.

16 Claims, 3 Drawing Figures

PIPE JOINTING

The present invention relates to improvements in pipe jointing and has for its principal object the provision of an improved method and apparatus for joining together two ends on site.

In accordance with one aspect of the invention there is provided a method of forming a joint between pipes having respective increased diameter end formations the method comprising winding a ductile strip wider than the two end formations over the end formations in such a way as to bend lateral portions of the strip downward toward the pipes behind the formations so that the formations are locked together by an enclosure formed by the wound and deformed strip which has reduced diameter lateral portions on opposite sides of the formations.

In accordance with another aspect of the invention there is provided apparatus for carrying out the method of the foregoing paragraph, the apparatus comprising means for spirally winding a strip of ductile metal over increased diameter end formations of two pipes and means for bending lateral portions of the strip down on opposite sides of the formations as it is wound. Said winding means is preferably adapted to rotate around the pipe ends without relative axial movement so that the strip is wound spirally over the end formations and said means for bending the strip down preferably comprises a suitably profiled roller which is urged to press the strip as it is wound against the end formations. The roller is preferably freely rotatable about its axis while being relatively rotated about the pipe ends jointly with the winding means and the roller may be a unitary waisted element or a series of roller sections which progressively increase in diameter from the centre of the roller toward its ends.

The apparatus preferably takes the form of a device comprising a frame, an annular member rotatably supported on the frame, means for rotating the annular member relative to the frame and mounted on the annular member in circumferentially spaced relation means for supporting a reel of ductile metal strip and a profiled, freely rotatable roller, the arrangement being such that the annular member can be brought to surround the end formations on two pipe ends and can be rotated about the pipe ends so that a ductile metal strip is wound onto the pipe ends and is bent down over the end formations, as it is wound, by the roller.

Braking means may be provided for the reel or other means may be provided whereby the degree of tension under which the strip is wound onto the pipe end formations is adjustable.

Preferably a plurality of rollers are provided positioned circumferentially around the inner diameter of the annular member, and successive rollers from the winding means have a successively greater profiling so that each turn of the strip is progressively subjected to a greater bending by successive rollers.

The device may include means positioned between the, or one of the rollers (for example the first roller) and reel supporting means for separating from the strip between successive turns around the pipe ends a separating medium interposed between turns of the strip on the reel. This separating means may take the form of a spool mounted on and driven for rotation relative to the annular member. The spool may be driven via a toothed bent by the, or one of the, rollers or by a separate motor mounted on the annular member.

The or each profiled roller is preferably mounted on the annular member to be adjustable radially of the latter and may be spring biased radially inwardly of the latter.

Preferably the annular member is in two parts which can be divided at one point on its circumference, the two parts being pivotally connected at another point on its circumference so that the annular member can be opened to position it about two flanged pipe ends.

A preferred embodiment of the invention will now be described with reference to the accompanying diagrammatic drawings, in which.

Figure 1:
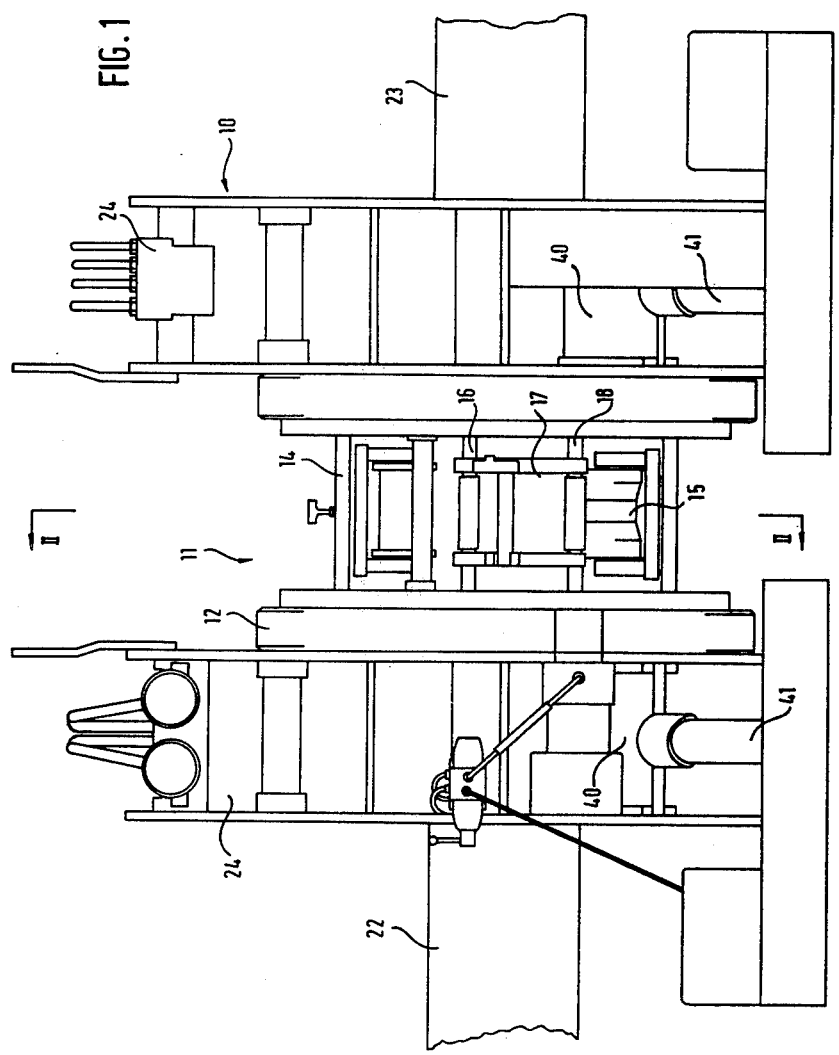
FIG. 1 is a side elevation of a jointing device in accordance with the invention shown surrounding two pipe ends.
Figure 2:
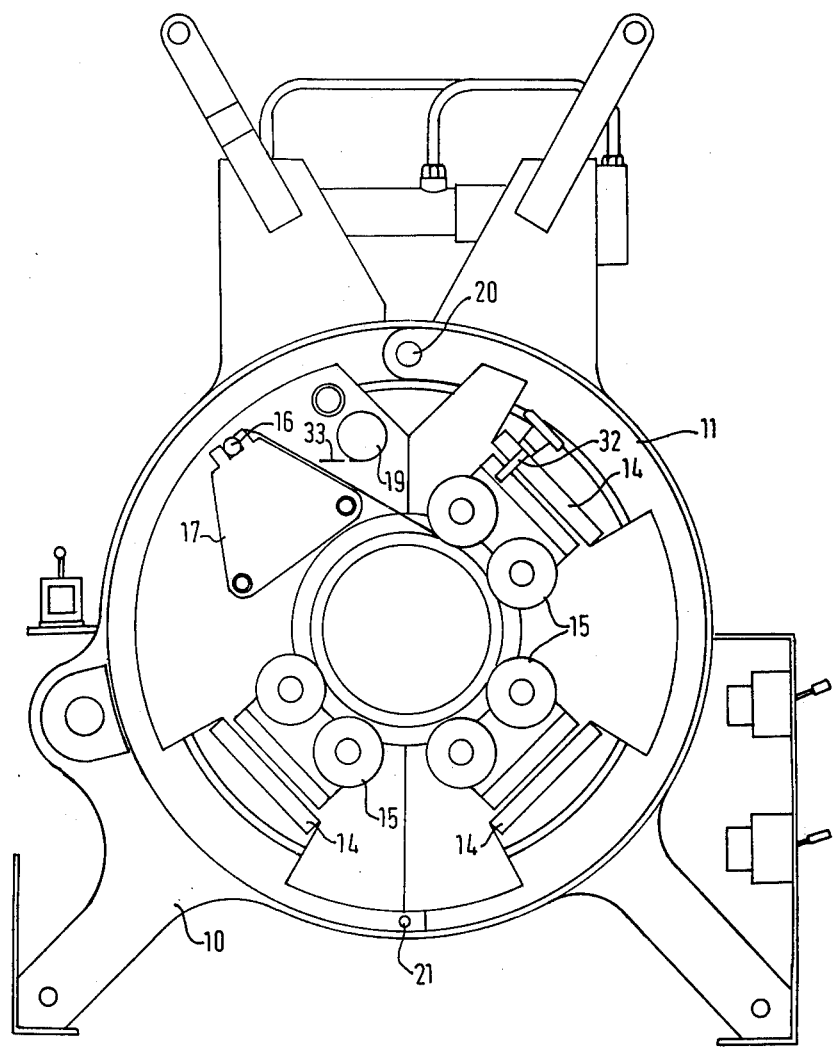
FIG. 2 is a sectional elevation taken on the line II—II of FIG. 1.

The device illustrated in FIGS. 1 and 2 comprises a frame 10 on which an annular member 11 is mounted for rotation about its axis. The annular member 11 comprises axially spaced apart ring gears 12 and 13 which are bridged by supports 14 for rollers 15, a support 16 for a reel 17 of ductile metal strip and a support 18 for a spool 19 the purpose of which will be described below. Each ring gear 12 and 13 consists of two parts which are pivotally connected as at 20 in FIG. 2 and releasably joined together as at 21 in FIG. 2 so that to locate the device over the adjacent ends of two coaxial pipes 22 and 23. Both the frame 10 and the annular member 11 can be hinged about the common axis of the pivots such as 20 and after positioning the device over the pipe ends it can be closed to the position shown.

Thereafter six clamping members 40 associated with the two ring gears 12 and 13 are moved radially into engagement with the pipe ends behind the radially projecting end formations thereof so that the frame 10 is held non-rotatably relative to the two pipes, and at the same time the coaxial alignment of the two pipes is ensured. Three equi-angularly spaced clamping members 40 are associated with each ring gear 12 and 13.

One of each set of three clamping members is mounted on screw-threaded means (not shown) whereby its position radially of the associated ring 12 or 13 is manually adjusted in accordance with the diameter of the pipe to be engaged. With said one of each set of clamping members in abutment with the respective pipe the other two clamping members of each set are moved into abutment with the pipes by hydraulic piston-and-cylinder assemblies such as 41 on which they are mounted. This has the effect of gripping the frame 11 non-rotatably to each pipe end and at the same time ensures that the two pipe ends are in coaxial alignment.

Pipe ends to be jointed may have increased diameter end formations of any known kind, for example flanges.

In use a reel 17 of ductile metal strip is mounted to be freely rotatable on the support 16 and the leading end of the strip is taken to the pipes 22, 23 below a first of the rollers 15. The device is provided with an electric motor 24 which, via suitable gearing (not shown) can rotate the ring gear 13 relative to the frame 10 and thus the ring gear 12 non-rotatably fixed to the ring gear 13 by the supports 14 for the rollers 15. In this way the rollers 15, the reel 17 and the spool 19 are bodily rotated with the rings 12 and 13 about the common axis of the two pipe ends. It will be apparent that if desired the ring gear 12 can be directly driven by a second electric motor (not shown) synchronized with the motor 24. With the motor 24 in operation rotation of the reel 17 together with the rollers 15 and spool 19 about the pipe ends wraps successive turns of the ductile metal strip about the pipe ends and over their end formations.

Figure 3:
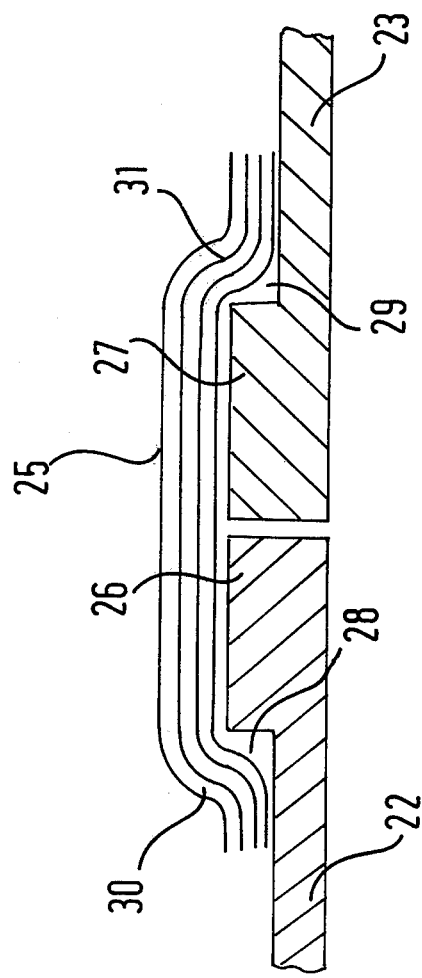
FIG. 3 is a radial section through two pipe ends provided with flanges and jointed by metal strip wound over them by the device of FIGS. 1 and 2.

A brake, (not shown) may be provided to adjust the tension applied to the strip as it is wound onto the pipes and such tension will tend to bend down the lateral edges of the strip on opposite sides of the end formations as shown in FIG. 3, where superimposed turns 25 of a spirally wound strip are shown surrounding end formations 26 and 27 built on the pipe ends. The approximately frustoconical cavities 28 and 29 behind the flanges 26 and 27 are filled with a suitable cast resin. By this arrangement the two pipe ends 22 and 23 are locked together by the windings 25 which form an enclosure which is of reduced diameter as at 30 and 31 behind the end formations 26 and 27.

Each roller 15 has a peripheral profile corresponding to the pipe joint so that as each turn of the originally flat metal strip is applied to the pipe ends it is deformed to the shape shown in FIG. 3 by the rollers 15. To avoid sudden, undue distortion of the metal strip the rollers 15 are given a successively greater profile from the reel 17 around the annular member (in the clockwise direction as shown in FIG. 2). In other words the central waist or reduced diameter section of each roller becomes progressively deeper in the direction indicated from one roller to the next until the final roller has a profile exactly corresponding with the finished joint. Each roller 15 may be a unitary, waisted rotatable element or each roller may be made up of a series of sections of varying diameters.

As shown in FIG. 2, the profiled rollers 15 are mounted in pairs on the supports 14, being adjustable radially of the annular member 11 by bolts such as 32 to adjust the pressure exerted by each pair of rollers on the strip as it is wound. If desired the bolts 32 may act against springs (not shown) whereby each pair of rollers 15 is spring-biased radially inwardly of the annular member 11.

If the metal strip used is of the kind which has a ribbon of adhesive on one side of the strip and a separating membrane over the ribbon of adhesive to prevent the turns of the strip in the reel 17 adhering together the spool 19 is used to withdraw the separating membrane 33 from between successive turns of the strip over the pipe ends so that the adhesive will be active between successive turns of the strip surrounding the pipe ends and end formations. To withdraw the separating membrane 33 the spool 19 is rotatable about its own axis while rotating with the annular member 11 and this is achieved either by connecting spool 19 to an adjacent roller 15 to rotate therewith by a toothed belt whereby the spool 19 is rotated in response to rotation of the annular member 11, or by the provision of a separate electric motor (not shown).

On site the pipe ends 22 and 23 are permanently joined by wrapping spiral windings 25 of metal strip over the adjacent formations 26,27 in such a way that the windings deform radially inwardly at opposite axial ends 30,31 to entrap the formations 26,27 and thus lock the pipes together. The on site application of deformed spiral windings 25 with a corrosion-resistant (preferably resinrich) layer between the pipes 22 and 23 and the formations 26 and 27 and the radially innermost winding 25, between the successive windings 25 and covering the radially outermost winding 25 provides a permanent, corrosion-resistant connection between the pipe sections.

Having now described our invention what we claim is:

1. A method of forming a joint between pipes having respective increased diameter end formations the method comprising winding a ductile metal strip wider than the two end formations over the end formations, bending the lateral portions of the strip downward toward the pipes behind the formations so that the formations are locked together by an enclosure formed by the wound and deformed strip which has reduced diameter lateral portions on opposite sides of the formations.

2. Apparatus for carrying out the method claimed in claim 1, the apparatus comprising means for spirally winding a strip of ductile metal over increased diameter end formations of two pipes and means for bending lateral portions of the strip down on opposite sides of the formations as it is wound.

3. Apparatus as claimed in claim 2, wherein the winding means is adapted to rotate around the pipe ends without relative axial movement so that the strip is wound spirally over the end formations.

4. Apparatus as claimed in claim 3, wherein said means for bending the strip down comprises a suitably profiled roller which is urged to press the strip as it is wound against the end formations.

5. Apparatus as claimed in claim 4, wherein the roller is freely rotatable about its axis while being relatively rotated about the pipe ends jointly with the winding means.

6. Apparatus as claimed in claim 5, wherein the roller is a unitary waisted element.

7. Apparatus as claimed in claim 5, wherein the roller comprises a series of roller sections which progressively increase in diameter from the centre of the roller toward its ends.

8. Apparatus as claimed in claim 2 in the form of a device comprising a frame, an annular member rotatably supported on the frame, means for rotating the annular member relative to the frame and mounted on the annular member in circumferentially spaced relation, means for supporting a reel of ductile metal strip and a profiled, freely rotatable roller, the arrangement being such that the annular member can be brought to surround the end formations on two pipe ends and can be rotated about the pipe ends so that a ductile metal strip is wound onto the pipe ends and is bent down over the end formations, as it is wound, by the roller.

9. Apparatus as claimed in claim 8, wherein means is provided whereby the degree of tension under which the strip is wound onto the pipe end formations is adjustable.

10. Apparatus as claimed in claim 9, wherein said means comprises a friction brake for the reel.

11. Apparatus as claimed in claim 8, wherein a plurality of rollers are provided positioned circumferentially around the inner diameter of the annular member, and successive rollers from the winding means have a successively greater profiling so that each turn of the strip is progressively subjected to a greater bending by successive rollers.

12. Apparatus as claimed in claim 11, wherein means is provided between the reel supporting means and an adjacent profiled roller for separating from the strip between successive turns around the pipe ends a separating medium interposed between turns of the strip on the reel.

13. Apparatus as claimed in claim 12, wherein the separatating means takes the form of a spool mounted on and driven for rotation relative to the annular member.

14. Apparatus as claimed in claim 13, wherein the spool is driven via a toothed belt by a profiled roller.

15. Apparatus as claimed in claim 8 wherein the or each profiled roller is mounted on the annular member to be adjustable radially of the latter and is spring biased radially inwardly of the latter.

16. Apparatus as claimed in claim 8 wherein the annular member is in two parts which can be divided at one point on its circumference, the two parts being pivotally connected at another point on its circumference so that the annular member can be opened to position it about two flanged pipe ends.

* * * * *